AIR INTAKE FLOWMETER FOR INTERNAL COMBUSTION ENGINES

BACKGROUND OF THE INVENTION

The invention relates to a flowmeter having a cast metal housing, a rectangular airflow channel therewithin, and a transversely-extending, trapezoidal pivotal baffle plate particularly for measurement of the air drawn in by an internal combustion engine through the air intake duct.

Flowmeters of this kind are already known, for example, they are used in fuel injection systems to ascertain the volume of air drawn into internal combustion engines. In a typical application, the transversely-extending pivotal baffle plate is deflected by a throttle-induced increase in the air flow until substantially the entire rectangular cross section of the flow channel is unrestricted. In addition, a spring mounted on the pivot shaft serves as an opposing force to the air pressure exerted on the baffle plate, so that the angular deflection of the baffle plate is a measure of the volume of air flow through the channel. The housings of these known flowmeters are, e.g., zinc castings. A circumferential clearance is provided between the baffle plate edges and the flow channel wall, amounting to approximately 0.1 to 0.2 mm total. Though a narrow circumferential edge clearance is, for functional reasons, normally provided, a concomitant problem may result due to unrelieved internal stresses in the cast metal housings so that in applications over a broad operating temperature range of the engine, e.g., from −40° to +120° C, the castings may expand unevenly and the damping flap or baffle plate may make contact with the walls of the flow channel or damping chamber, thus impeding their free pivotal motion.

OBJECT AND SUMMARY OF THE INVENTION

The object of this invention is to provide a baffle plate of known type which can be employed over broad temperature ranges, without incurring the above-described problems.

This object is achieved, according to one embodiment of the invention, by positioning a trapezoidal-shaped baffle plate transversely of the flow channel, the longer of the parallel sides being mounted adjacent the pivot shaft and the shorter, opposed, parallel side lying adjacent the top of the flow channel.

According to an especially advantageous embodiment of the invention, the baffle plate mechanism is provided with a damping flap, also mounted on the pivot shaft, angularly offset with respect to the baffle plate and moving in a rectangular-shaped damping chamber. The damping flap also has a trapezoidal-shaped cross section, and the damping flap edge adjacent the pivot shaft is longer than the oppositely-disposed parallel edge.

The trapezoidal-shaped design of the baffle plate and the damping flap avoids contact with the walls of the flow channel and damping chamber, resulting from temperature-dependent expansion in the structural elements thereof, yet the resultant clearance between the edges of the plate or flap and the walls of the flow channel remain within acceptable limits.

BRIEF DESCRIPTION OF THE DRAWING

An exemplary embodiment of the object of the invention is shown in the drawings and more fully described hereinafter.

DESCRIPTION OF THE PREFERRED EMBODIMENT

Figure 1:
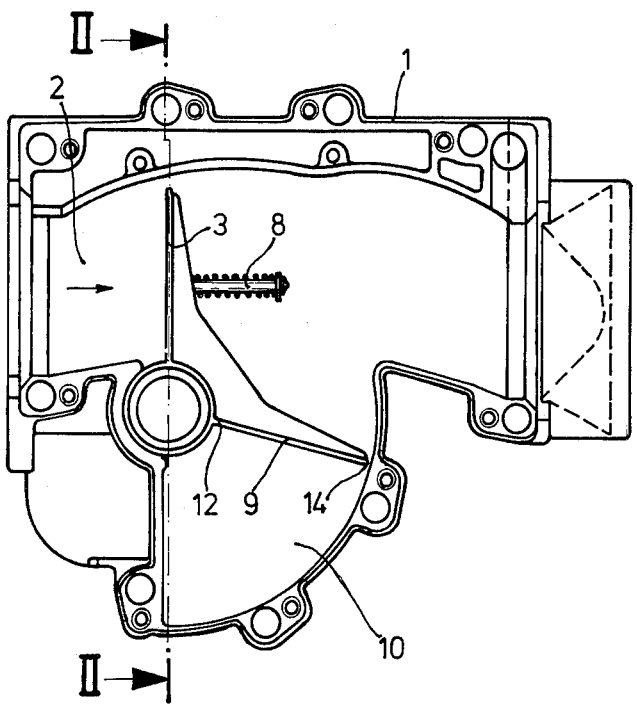
FIG. 1 shows a cross section of the flowmeter.
Figure 2:
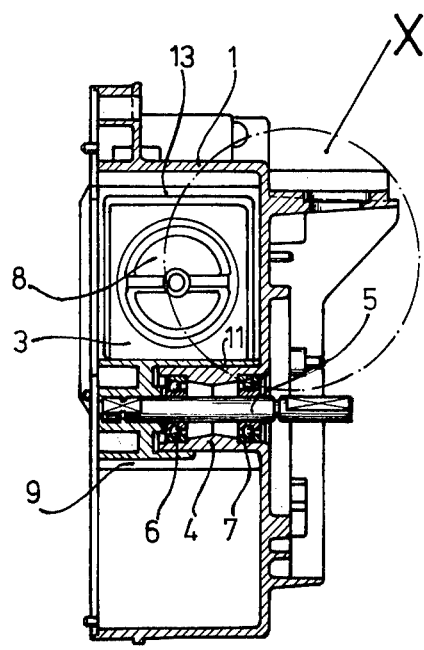
FIG. 2 shows a cross section of the flowmeter along line II—II of FIG. 1.

Turning now to FIG. 1, the intake air of the internal combustion engine is drawn through a flow channel 2 in a housing 1, provided with a baffle plate 3 positioned in an air intake pipe (not shown) to individual cylinders of the internal combustion engine. The baffle plate 3 is held in a bearing compartment 4 of the cast zinc housing 1 by a pivot shaft 5 and ball bearings 6, 7 in a unilateral manner.

In the special application of the flowmeter in the air intake pipe of an internal combustion engine, a safety valve 8 is disposed on the baffle plate 3 for the reduction of pressure shocks exerted opposite to the air flow directed against the baffle plate 3. For the damping of pulsations, a damping flap 9 is provided on the pivot shaft in spaced angular relation thereto; the damping flap revolves on the axis of the pivot shaft 5 and moves in a damping chamber 10 when the baffle plate is deflected by the air flow. The baffle plate is deflected against the force of a spiral spring mounted on the pivot shaft (not shown). The angular position of the baffle plate 3 or of the pivot shaft 5 may, for example, be electrically measured using a potentiometer, as an indication of the air flow rate.

Figure 3:
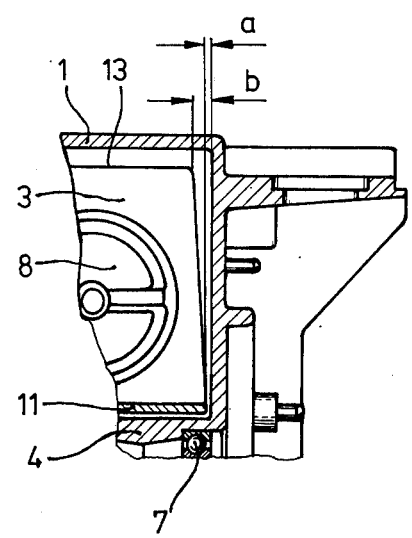
FIG. 3 shows a detailed partial view of FIG. 2 on a larger scale.

According to one embodiment of the invention, the baffle plate 3, and the damping flap 9 are trapezoidal-shaped and so disposed that the longer edge of the baffle plate 11 and that of the damping flap 12 lie adjacent the pivot shaft 5. In addition, FIG. 3 shows that the baffle plate 3 is provided with lateral clearances separating it from the chamber wall by the distance (a) at its longer edge and the distance (b) at its shorter edge, respectively, 0.12 mm and 0.25 mm. This embodiment of the invention prevents the adverse effects of temperature changes referred to previously, i.e., rubbing contact of the plate or flap with the walls as a result of uneven thermal expansion due to remanent internal stresses in the casting, thus maintaining the required accuracy of the flowmeter.

The foregoing relates to a preferred exemplary embodiment of the invention within the spirit and scope of which other embodiments and variants are possible, the scope being defined by the appended claims.

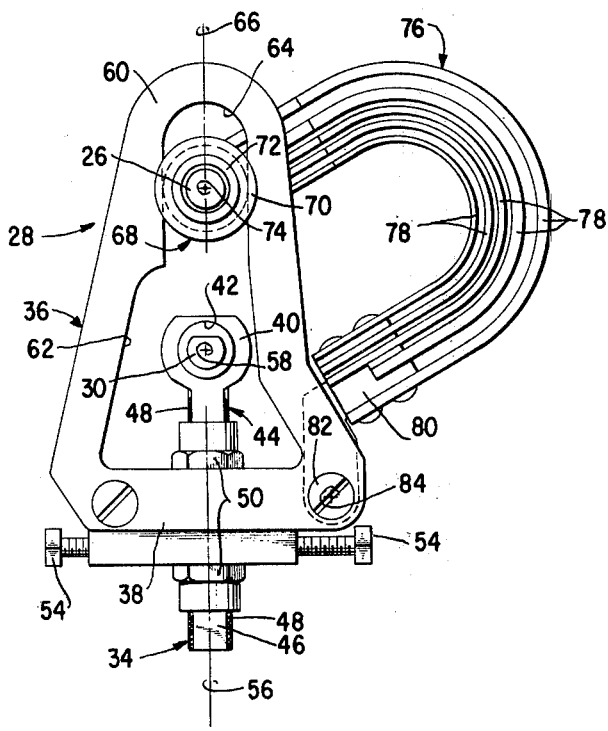

What is claimed is:

1. In a flowmeter for measuring the air intake flow in an internal combustion engine, including a cast housing, a rectangular flow channel provided therein and a transversely extending baffle plate mounted on a pivotal shaft, the improvement comprising that the baffle plate is substantially trapezoidal-shaped having longer and shorter oppositely disposed parallel edge portions, the longer of said edge portions lying adjacent said pivotal shaft.

2. A flowmeter according to claim 1, wherein a trapezoidal-shaped damping flap is provided on the pivotal shaft in spaced angular relation to said baffle plate and mounted to move within a rectangular walled, semi-circular damping chamber, the damping flap further having longer and shorter oppositely-disposed parallel edge portions, the longer of said edge portions lying adjacent said pivotal shaft.

* * * * *

United States Patent

[19]

Douglas

[11] 4,040,296

[45] Aug. 9, 1977

[54] GAS METER TEMPERATURE COMPENSATING TANGENTS

[75] Inventor: Robert Ritson Douglas, Philadelphia, Pa.

[73] Assignee: The Singer Company, New York, N.Y.

[21] Appl. No.: 719,542

[22] Filed: Sept. 1, 1976

[51] Int. Cl.$^2$ .................. G01F 3/22; G01F 15/04
[52] U.S. Cl. ................................................. 73/281
[58] Field of Search ............ 73/233, 266, 267, 281, 73/344, 363.1, 363.3, 363.5

[56] References Cited

U.S. PATENT DOCUMENTS

| | | | |
|---|---|---|---|
| 2,793,814 | 5/1957 | Velan | 73/363.1 X |
| 3,132,513 | 5/1964 | Heffernan et al. | 73/281 |

FOREIGN PATENT DOCUMENTS

| | | | |
|---|---|---|---|
| 161,480 | 4/1921 | United Kingdom | 73/281 |

Primary Examiner—James J. Gill
Attorney, Agent, or Firm—Edward L. Bell; Robert E. Smith; Harold Weinstein

[57] ABSTRACT

A gas meter temperature compensating tangent device having a tangent block to which is adjustably connected a tangent arm for journaling a crankshaft. The tangent block has a guideway formed in alignment with the axial line of the tangent arm. A plurality of nested "U" shaped bi-metal strips have one end pivotably connected to the tangent block and the other end connected to a tangent wrist which is slideably disposed in the guideway. The bi-metal strips will sense temperature changes in the gas and force the tangent wrist to slide in the guideway to increase or decrease the distance between the tangent wrist and the crankshaft.

The tangent device provides improved accurate deflection due to temperature changes as a result of built-in radial rigidity of the tangent wrist relative to the tangent arm.

3 Claims, 4 Drawing Figures